United States Patent
Kunii

(10) Patent No.: US 6,985,369 B2
(45) Date of Patent: Jan. 10, 2006

(54) DC-DC CONVERTER

(75) Inventor: Shingo Kunii, Otsu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 116 days.

(21) Appl. No.: 10/666,597

(22) Filed: Sep. 18, 2003

(65) Prior Publication Data

US 2004/0174722 A1 Sep. 9, 2004

(30) Foreign Application Priority Data

Oct. 18, 2002 (JP) ............... 2002-304763

(51) Int. Cl.
*H02M 3/335* (2006.01)
(52) U.S. Cl. ............... 363/19; 363/20; 323/276
(58) Field of Classification Search ............... 363/19, 363/97, 20, 95, 16, 17, 21.4, 21.12; 323/289, 323/901, 222, 902, 272, 276
See application file for complete search history.

(56) References Cited

U.S. PATENT DOCUMENTS 4,758,937 A 7/1988 Usui et al.
4,763,236 A * 8/1988 Usui ............... 363/19
5,661,642 A 8/1997 Shimashita

FOREIGN PATENT DOCUMENTS

EP 0 287 109 4/1988
JP 08-331844 12/1996

* cited by examiner

Primary Examiner—Rajnikant B. Patel
(74) Attorney, Agent, or Firm—Keating & Bennett, LLP

(57) ABSTRACT

A DC-DC converter achieves a high level of a signal superimposed in an AC manner onto the output of an insulator such as a photocoupler, and there are very few limitations in the aspects of constant design, phase correction, starting characteristics, and short-circuit protection. A secondary-side control circuit detects an output voltage, and feeds back a control signal to a drive control circuit on the primary side via a photocoupler. The photocoupler insulates the primary side of a DC-DC converter from the secondary side thereof, wherein the control signal output from the secondary-side control circuit is transmitted to the primary side. The output signal of an auxiliary power-supply circuit is superimposed in an AC manner onto the control signal via a coupling capacitor. The drive control circuit has a configuration in which a pulse control signal is applied to a switching element in order to stabilize the output voltage of a secondary-side circuit on the basis of the control signal.

11 Claims, 6 Drawing Sheets

DC-DC CONVERTER

BACKGROUND OF THE INVENTION

1. Field of the Invention

The present invention relates to a DC-DC converter and, more particularly, the present invention relates to an insulated DC-DC converter used in such a way that the primary side and the secondary side are insulated from each other.

2. Description of the Related Art

In an insulated DC-DC converter, it is common practice for a photocoupler to be used for the feedback of a signal from the secondary side to the primary side (the output voltage is detected, and based on this voltage, the switching of a switching element is controlled via a switching control circuit of the primary side). However, several problems arise in that, since, in the photocoupler, a phase delay becomes larger and responsiveness becomes poor with respect to a high-frequency signal, if the switching frequency is increased, oscillation is likely to occur, and responsiveness with respect to load variations becomes poor.

Accordingly, in order to solve these problems, a DC-DC converter described in Japanese Unexamined Patent Application Publication No. 8-331844 has been proposed. This DC-DC converter is such that responsiveness is improved by making corrections by using a primary-side signal with a small phase delay. That is, as shown in FIG. 5, the transformer is provided with a primary coil n1, a secondary coil n2, and an auxiliary coil ns. An input voltage source 110 rectifies and smoothes the AC current from, for example, the commercial AC power source in order to generate a DC voltage Vin. The input voltage source 110 is connected to the primary coil n1 and is turned on/off by the switching element Q of a transistor, etc. Since a switching voltage signal is induced in the secondary coil n2, an output voltage Vout, which is transformed into a direct current by the rectifying and smoothing circuit of a diode D1 and an output capacitor 113, is supplied to a load 120.

An error amplifier 130 compares the output voltage Vout with the reference voltage, and outputs an error signal corresponding to this error voltage. A photocoupler 140 insulates the primary side of the DC-DC converter 100 from the secondary side thereof, wherein the error signal output from the error amplifier 130 is transmitted to the primary side. A drive circuit 150 inputs an error signal transmitted from the photocoupler 140, and applies, to the switching element Q, a switching control signal in a direction in which the output voltage Vout and the reference voltage match each other. An auxiliary power-supply circuit 160 generates a voltage for operating the drive circuit 150 in such a way that the switching signal induced in the auxiliary coil ns is transformed into a direct current by the rectifying and smoothing circuit of a diode D2 and a capacitor 114 and an auxiliary power voltage is generated.

Voltage-dividing resistors 116 and 117 divide the output voltage of the auxiliary power-supply circuit 160, and generate a signal that is proportional to the output voltage of the auxiliary power-supply circuit 160. A coupling capacitor 115 superimposes, in an AC manner, the output voltage signal sent from the voltage-dividing resistors 116 and 117 onto the error voltage signal transmitted to the drive circuit 150 from the photocoupler 140.

In this manner, the voltage induced in the auxiliary coil ns provided in the transformer is rectified and smoothed by the auxiliary power-supply circuit 160, this voltage is detected by using the output voltage detection elements, namely, the voltage-dividing resistors 116 and 117, by resistance division, and the AC components contained in this detected signal are superimposed in an AC manner onto the output of the photocoupler 140 via the coupling device (the coupling capacitor 115). Thus, stability with respect to oscillation, etc., is improved.

However, in a conventional DC-DC converter 100, since the voltage induced in the auxiliary coil ns is detected by using the output voltage detection elements 116 and 117 by resistance division, there are problems in that the level of the signal superimposed in an AC manner onto the output of the photocoupler 140 becomes extremely low. In particular, the serious problems are that the flexibility of constant design is low, and there are a large number of limitations on the aspects of phase correction, starting characteristics, and short-circuit protection.

For the voltage-dividing resistor 116 of the output voltage detection elements, usually, a resistor having a large resistance value (10 kΩ or more) is used to prevent a decrease in the efficiency (an increase in the loss). Here, to ensure a sufficient amount of phase correction, it is necessary to decrease the impedance of the series circuit of the coupling capacitor 115 and the voltage-dividing resistor 116. However, since the resistance R of the voltage-dividing resistor 116 is large, if attempts are made to decrease the impedance, it is necessary to increase the electrostatic capacitance C of the coupling capacitor 115.

When the DC-DC converter 100 is to be started, the coupling capacitor 115 is charged by the time constant CR represented by the product of the electrostatic capacitance C thereof and the resistance R of the voltage-dividing resistor 116. However, since the time constant CR is large, the charging time is increased. The rise waveform of the output voltage Vout at the starting time becomes less sharp, and the starting time tr1 is increased (see FIG. 6).

The DC-DC converter is usually provided with a short-circuit protection circuit including a diode, a transistor, etc. This short-circuit protection circuit is so designed that, in order to decrease stress imposed on a diode and a transistor during the short-circuited time, a mask time becomes as short as possible so that the short-circuit protection circuit does not malfunction during the starting time. On the other hand, in order that the short-circuit protection circuit does not malfunction during the starting time, it is necessary to set the mask time to be greater than or equal to the starting time tr1. Therefore, when the starting time tr1 is long as shown in FIG. 6, the mask time cannot be decreased, and thus, for diodes and transistors, there occurs the necessity to use expensive and large types which can withstand a large stress during the short-circuited time.

SUMMARY OF THE INVENTION

In order to overcome the problems described above, preferred embodiments of the present invention provide a DC-DC converter in which the level of the signal superimposed in an AC manner onto the output of an insulating element, such as a photocoupler, is large, and there are very few limitations in the aspects of circuit design, phase correction, and starting characteristics, and short-circuit protection.

According to a preferred embodiment of the present invention, a DC-DC converter includes (a) a primary-side circuit for outputting energy of a primary coil of a transformer to a secondary coil side in accordance with the on/off operation of a switching element; (b) a secondary-side circuit for rectifying and smoothing the voltage output from the secondary coil of the transformer and for outputting a DC voltage; (c) an auxiliary power-supply circuit for rectifying and smoothing the voltage output from an auxiliary power-supply coil provided in the transformer; (d) a secondary-side control circuit for detecting the DC output voltage of the secondary-side circuit and for outputting a control signal; (e) a drive control circuit for outputting a pulse control signal for controlling the on/off operation of the switching element on the basis of the control signal output from the secondary-side control circuit; (f) an insulator for transmitting the control signal output from the secondary-side control circuit to the drive control circuit; and (g) a coupler for superimposing, in an AC manner, the output of the auxiliary power-supply circuit onto the control signal transmitted to the drive control circuit, wherein the output of the auxiliary power-supply circuit and the coupler are directly connected to each other electrically.

The auxiliary power-supply circuit is preferably directly connected to the coupler without any voltage-dividing resistors. The electrostatic capacitance of a coupling capacitor, which is a coupler, can be set freely.

Other features, elements, characteristics and advantages of the present invention will become more apparent from the following detailed description of preferred embodiments thereof with reference to the attached drawings.

DETAILED DESCRIPTION OF PREFERRED EMBODIMENTS

A preferred embodiment of a DC-DC converter according to the present invention will now be described below with reference to the attached drawings. In this preferred embodiment, a description is given by using an insulated forward DC-DC converter as an example.

Figure 1:
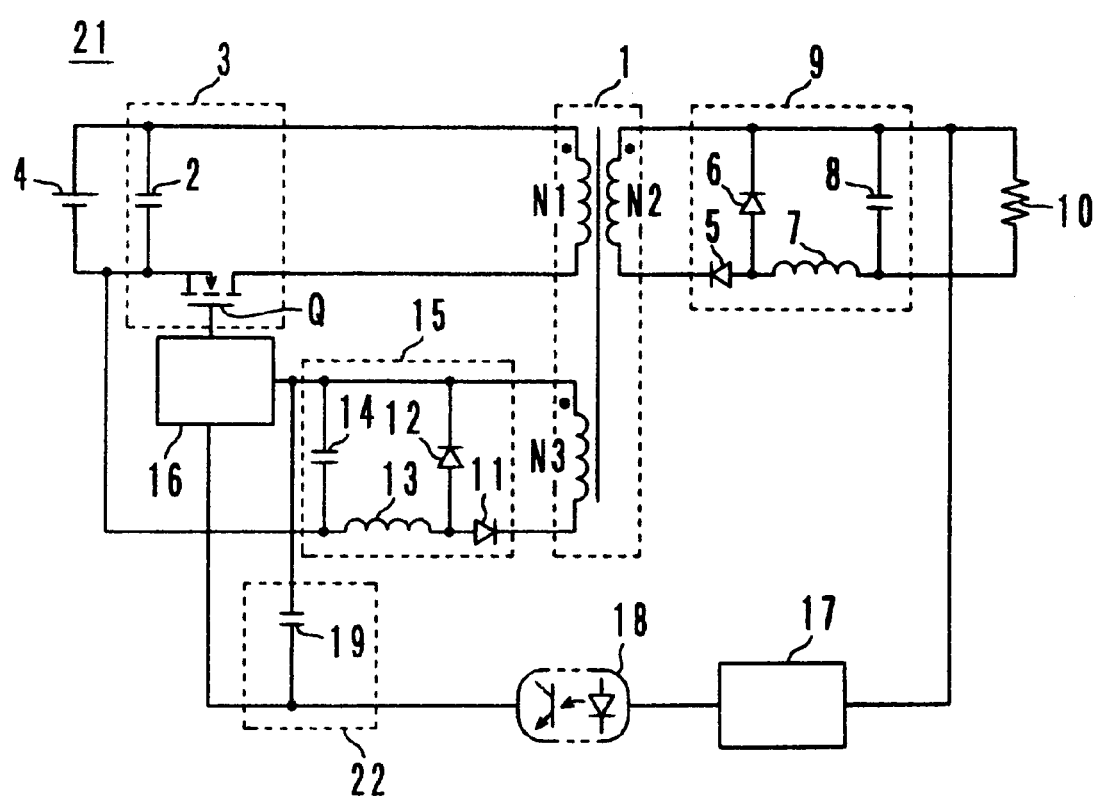
FIG. 1 is an electrical circuit diagram showing a preferred embodiment of a DC-DC converter according to the present invention.

As shown in FIG. 1, a transformer 1 of a DC-DC converter 21 is provided with a primary coil N1, a secondary coil N2, and an auxiliary power-supply coil N3. A primary-side circuit 3 including a switching element Q and a capacitor 2 is connected to the primary coil N1 of the transformer 1. A DC input power supply 4 is connected to the primary-side circuit 3.

A secondary-side circuit 9 including diodes 5 and 6, a coil 7, and a capacitor 8 is connected to the secondary coil N2, and the output side of the secondary-side circuit 9 is connected to a load 10. Furthermore, an auxiliary power-supply circuit 15 including diodes 11 and 12, a coil 13, and a capacitor 14 is connected to the auxiliary power-supply coil N3. The auxiliary power-supply circuit 15 generates a voltage for operating a drive control circuit 16, and the output side thereof is connected to the drive control circuit 16. The output side of the drive control circuit 16 is connected to the switching element Q of the primary-side circuit 3.

The primary-side circuit 3 has a configuration in which the electric power of the input power supply 4 is transmitted to the secondary-side circuit 9 in accordance with the on/off operation of the switching element Q. The secondary-side circuit 9 has a configuration in which the voltage generated in the secondary coil N2 is rectified and smoothed, and the rectified and smoothed DC voltage Vout is output to the load 10.

Furthermore, the auxiliary power-supply circuit 15 has a configuration in which a voltage generated in the auxiliary power-supply coil N3 is rectified and smoothed. It can be assumed that, in the auxiliary power-supply coil N3, a voltage with a phase equal to the voltage generated in the secondary coil N2 is generated. Furthermore, it can be assumed that the phase of the voltage generated in the secondary coil N2 is equal to the phase of the output voltage Vout of the secondary-side circuit 9. As a result, the auxiliary power-supply circuit 15 outputs a voltage proportional to the output voltage Vout. The voltage output from the auxiliary power-supply circuit 15 has ripple components, and since these ripple components, that is, AC components, are a primary-side signal, the phase delay is small.

A secondary-side control circuit 17 detects the output voltage Vout, and feeds back a control signal to the drive control circuit 16 on the primary side via a photocoupler 18. The photocoupler 18 insulates the primary side of the DC-DC converter 21 from the secondary side thereof, wherein the control signal output from the secondary-side control circuit 17 is transmitted to the primary side.

The output signal of the auxiliary power-supply circuit 15 is superimposed onto the control signal via a coupling device 22 without being divided by resistors, or other such elements. The coupling device 22 preferably includes a coupling capacitor 19 for extracting only the AC components from the output signal of the auxiliary power-supply circuit 15. The drive control circuit 16 has a configuration in which a pulse control signal is applied to the switching element Q in order to stabilize the output voltage Vout of the secondary-side circuit 9 on the basis of the control signal. The pulse control signal is a signal for controlling the on/off operation of the switching element Q, and the switching element Q performs an on/off operation in accordance with the pulse control signal.

In the manner described above, output voltage control is performed by using the photocoupler 18, and in the photocoupler 18, a phase delay occurs at higher frequencies. On the other hand, the AC components of the output signal of the auxiliary power-supply circuit 15 have a small phase delay, and only the AC components are applied to the control signal via the coupling capacitor 19, making it possible to prevent a phase delay at higher frequencies. This makes it possible to increase the responsiveness of control with respect to variations in the load.

In the DC-DC converter 21 having the above-described configuration, the auxiliary power-supply circuit 15 is directly connected to the coupling device 22 without any voltage-dividing resistors, and the electrostatic capacitance of the coupling capacitor 19 can be set freely. Therefore, the amount of correction can be secured by the coupling capacitor 19 having a small electrostatic capacity. As a result, the rise waveform of the output voltage Vout when the DC-DC converter 21 is started becomes sharp, and the starting time tr2 can be shortened (see FIG. 2).

Figure 2:
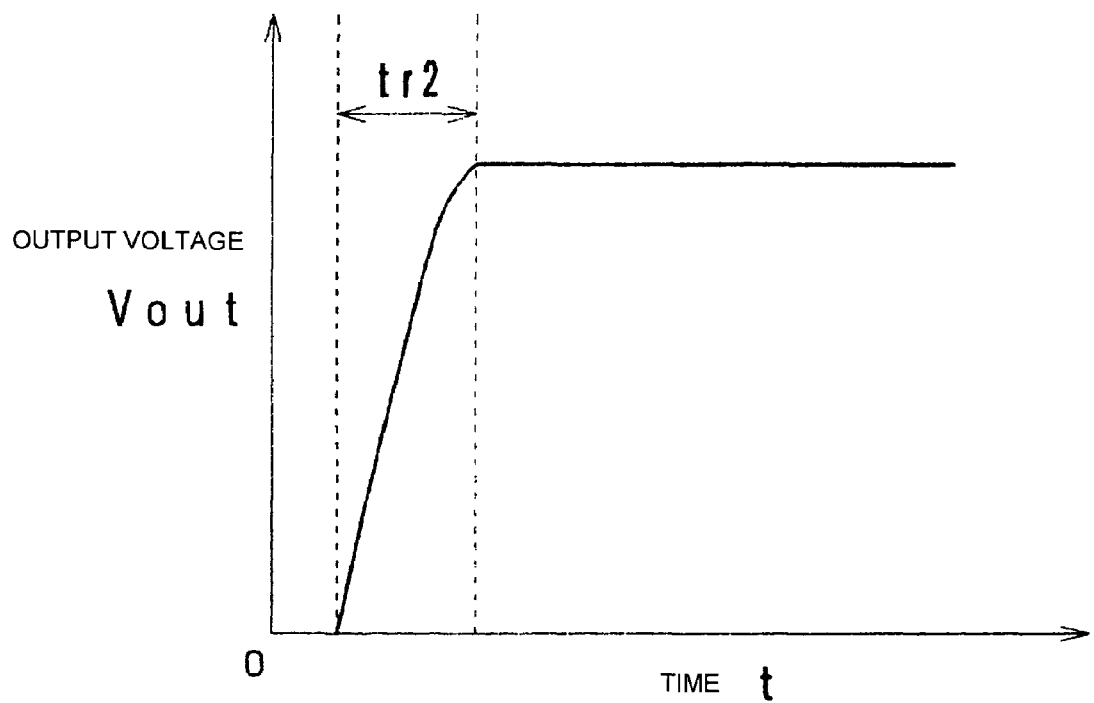
FIG. 2 is a graph showing the rise waveform of an output voltage Vout when the DC-DC converter shown in FIG. 1 is started.

As shown in FIG. 2, when the starting time tr2 is short, the mask time for decreasing the stress imposed on the diodes and the transistors of the short-circuit protection circuit can be decreased. Therefore, inexpensive and small types of diodes and transistors can be used.

In this preferred embodiment, although the coupling device 22 preferably including the coupling capacitor 19 is used to feed back the AC components on the primary side, another AC-like coupling circuit, such as a source follower circuit using an FET, an emitter follower circuit using a transistor, a high-pass filter circuit using an OP amplifier, and a transformer coupling circuit, may be used.

Figure 3A:
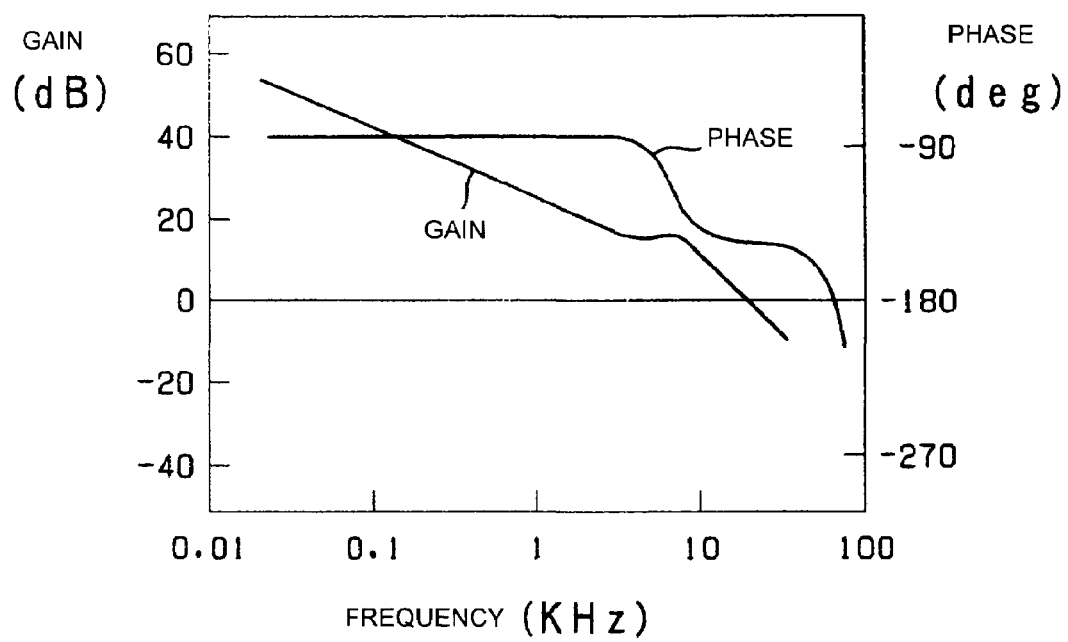
FIG. 3A is a graph showing gain characteristics and phase characteristics of the DC-DC converter shown in FIG. 1.
Figure 3B:
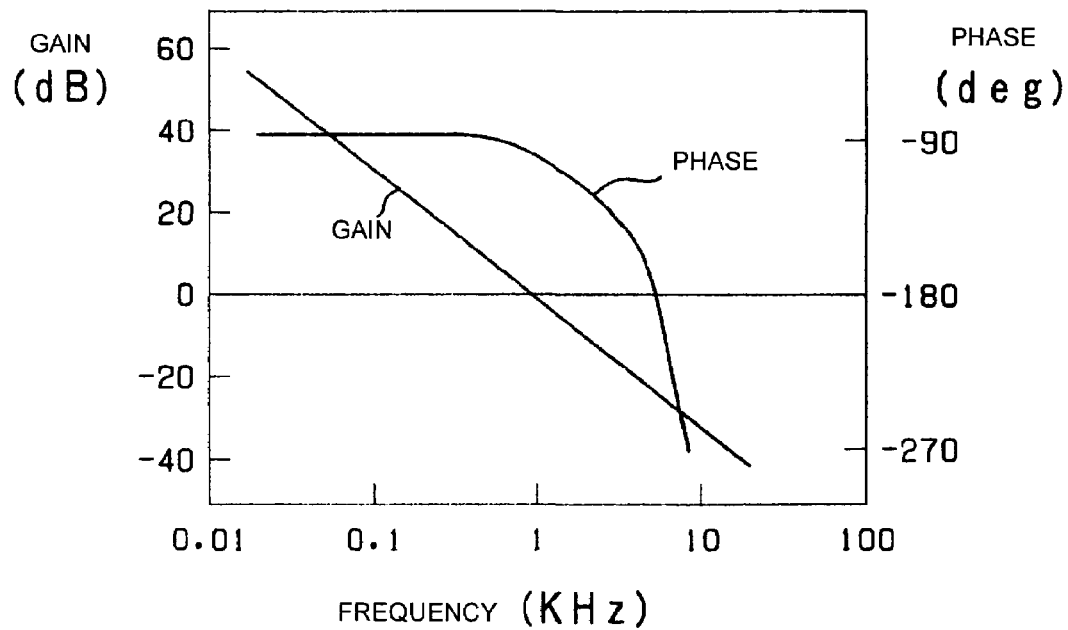
FIG. 3B is a graph showing gain characteristics and phase characteristics when a coupling capacitor is omitted in the DC-DC converter shown in FIG. 1.

FIG. 3A shows gain characteristics and phase characteristics of the DC-DC converter 21. For comparison purposes, FIG. 3B shows gain characteristics and phase characteristics when the coupling capacitor 19 is omitted in the DC-DC converter 21. As shown in FIG. 3A, in the DC-DC converter 21, the phase at high frequencies of 10 kHz or higher leads, and the gain crossover frequency can be increased to a region of 10 kHz or higher.

The DC-DC converter according to the present invention is not limited to the above-described preferred embodiments, and can be variously changed within the spirit and scope of the present invention. In particular, the present invention is not limited to a forward DC-DC converter (a DC-DC converter in which energy is transmitted to the secondary side while the switching element is on). For example, the present invention can also be applied to a flyback DC-DC converter (a DC-DC converter in which energy is stored in the transformer while the switching element is on, and energy is transmitted to the secondary side while the switching element is off).

Figure 4:
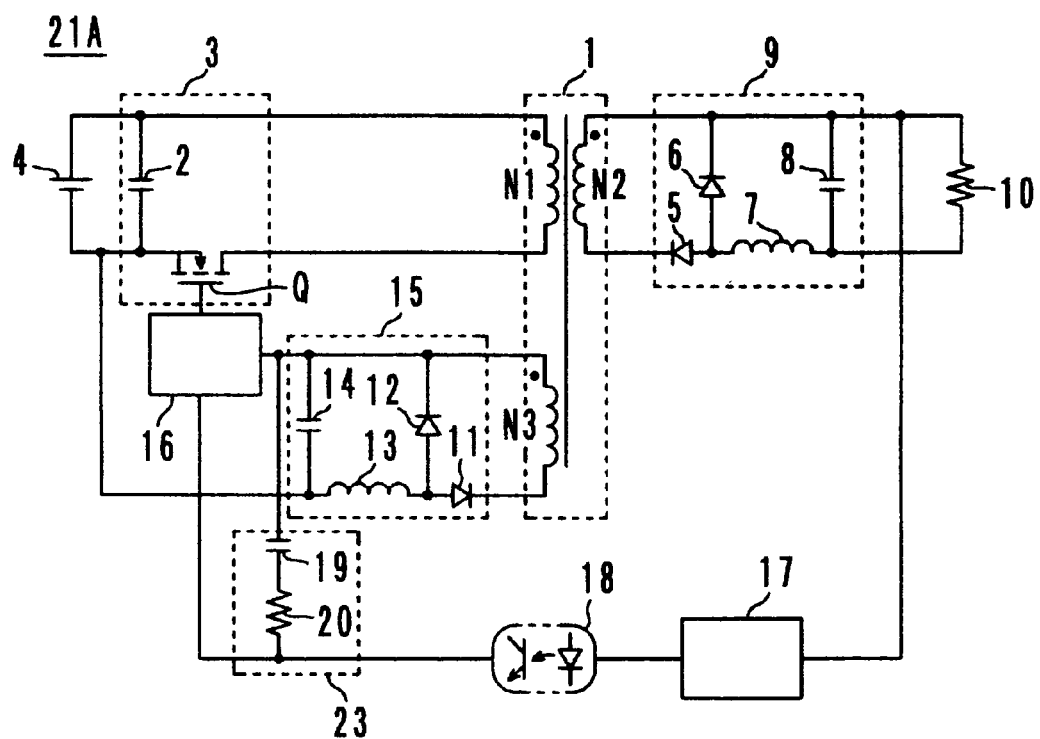
FIG. 4 is an electrical circuit diagram showing a modification of the DC-DC converter shown in FIG. 1.
Figure 5:
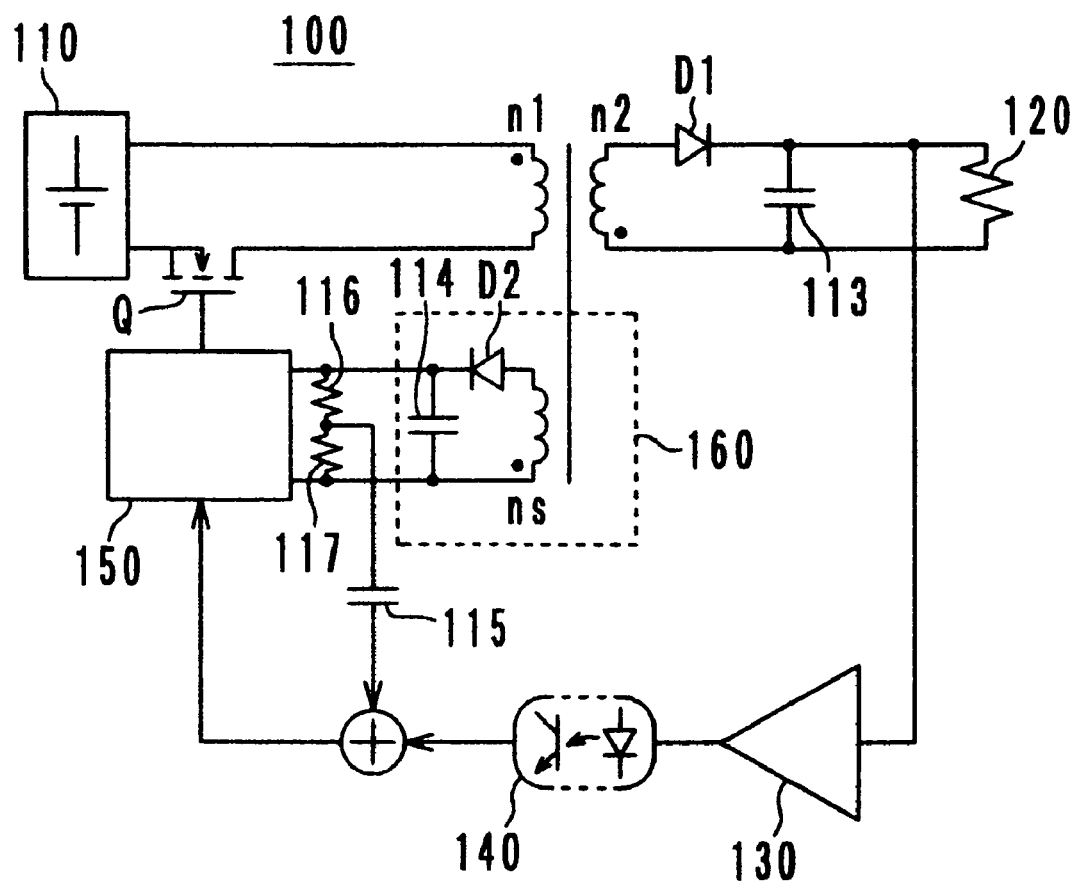
FIG. 5 is an electrical circuit diagram showing a conventional DC-DC converter.
Figure 6:
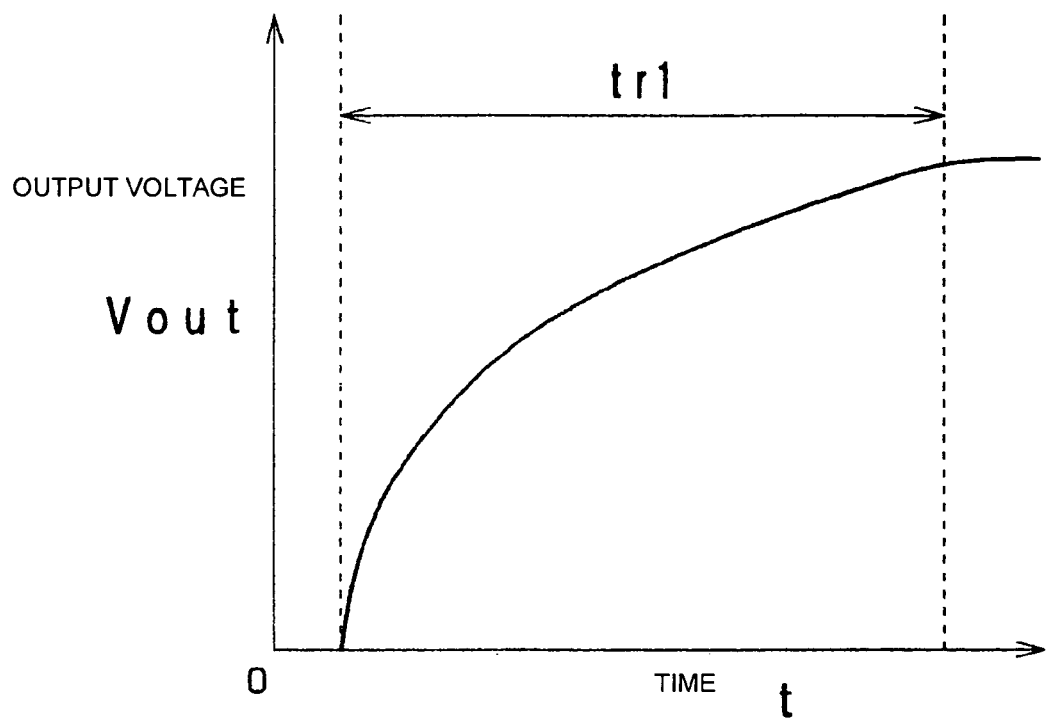
FIG. 6 is a graph showing the rise waveform of an output voltage Vout when the DC-DC converter shown in FIG. 5 is started.

As shown in FIG. 4, a DC-DC converter 21A in which a resistor 20 is connected in series to the coupling capacitor 19 in the coupling device 23 may be used. As a result, the flexibility of constant design of the control system including the coupling capacitor 19, the photocoupler 18, and the secondary-side control circuit 17 is further increased.

As is clear from the foregoing, according to various preferred embodiments of the present invention, the output of the auxiliary power-supply circuit is directly connected to the coupler without any voltage-dividing resistors, and the capacitance of the coupling capacitor, which is a coupler, can be set freely. Therefore, the flexibility of constant design is increased. Furthermore, since the amount of correction can be secured by using a coupling capacitor having a small electrostatic capacitance, the rise waveform of the output voltage Vout when the DC-DC converter is started can be made sharp, and the starting time can be shortened.

When the starting time is short, the mask time of the short-circuit protection circuit can be decreased, and the stress imposed on diodes and transistors can be decreased. Therefore, inexpensive and small types of diodes and transistors can be used.

The present invention is not limited to each of the above-described preferred embodiments, and various modifications are possible within the range described in the claims. An embodiment obtained by appropriately combining technical means disclosed in each of the different preferred embodiments is included in the technical scope of the present invention.

What is claimed is:

1. A DC-DC converter comprising:
   a primary-side circuit for outputting energy of a primary coil of a transformer to a secondary coil side in accordance with an on/off operation of a switching element;
   a secondary-side circuit for rectifying and smoothing a voltage output from the secondary coil of said transformer and for outputting a DC voltage;
   an auxiliary power-supply circuit for rectifying and smoothing the voltage output from an auxiliary power-supply coil provided in said transformer;
   a secondary-side control circuit for detecting the DC output voltage of said secondary-side circuit and for outputting a control signal;
   a drive control circuit for outputting a pulse control signal for controlling the on/off operation of said switching element on the basis of the control signal output from said secondary-side control circuit;
   an insulator for transmitting the control signal output from said secondary-side control circuit to said drive control circuit; and
   a coupling device for superimposing, in an AC manner, the output of said auxiliary power-supply circuit onto the control signal transmitted to said drive control circuit; wherein
   the output of said auxiliary power-supply circuit and said coupling device are directly connected to each other electrically.

2. The DC-DC converter according to claim 1, wherein the secondary-side circuit includes a plurality of diodes, a coil, and a capacitor connected to the secondary coil.

3. The DC-DC converter according to claim 1, wherein the auxiliary power-supply circuit includes a plurality of diodes, a coil, and a capacitor connected to the auxiliary power-supply coil.

4. The DC-DC converter according to claim 1, wherein the auxiliary power-supply circuit generates a voltage for operating the drive control circuit and an output side of the auxiliary power-supply circuit is electrically connected to the drive control circuit.

5. The DC-DC converter according to claim 1, wherein an output side of the drive control circuit is electrically connected to the switching element of the primary-side circuit.

6. The DC-DC converter according to claim 1, wherein the insulator includes a photocoupler.

7. The DC-DC converter according to claim 6, wherein the photocoupler insulates a primary side and a secondary side of the DC-DC converter.

8. The DC-DC converter according to claim 1, wherein the coupling device includes a coupling capacitor arranged to extract only the AC components from the output signal of the auxiliary power-supply circuit.

9. The DC-DC converter according to claim 1, wherein the coupling device includes at least one of a source follower circuit including an FET, an emitter follower circuit including a transistor, a high-pass filter circuit including an OP amplifier, and a transformer coupling circuit.

10. The DC-DC converter according to claim 1, wherein the DC-DC convert comprises one of a forward DC-DC converter and a flyback DC-DC converter.

11. The DC-DC converter according to claim 1, wherein a resistor is connected in series to the coupling device.

* * * * *